(12) United States Patent
Mansour (10) Patent No.: US 10,066,445 B2
(45) Date of Patent: Sep. 4, 2018

(54) TUBULAR CONNECTION ASSEMBLY FOR IMPROVED FATIGUE PERFORMANCE OF METALLIC RISERS

(71) Applicant: ARTIFEX ENGINEERING, INC., Houston, TX (US)

(72) Inventor: Ghiath N. Mansour, Houston, TX (US)

(73) Assignee: ARTIFEX ENGINEERING, INC., Houston, TX (US)

( * ) Notice: Subject to any disclaimer, the term of this patent is extended or adjusted under 35 U.S.C. 154(b) by 306 days.

(21) Appl. No.: 14/971,919

(22) Filed: Dec. 16, 2015

(65) Prior Publication Data

US 2017/0175460 A1 Jun. 22, 2017

(51) Int. Cl.

| | |
|---|---|
| *E21B 17/04* | (2006.01) |
| *B23K 31/02* | (2006.01) |
| *E21B 17/01* | (2006.01) |
| *F16L 13/02* | (2006.01) |
| *F16L 13/04* | (2006.01) |
| *F16L 57/02* | (2006.01) |
| *F16L 1/15* | (2006.01) |
| *E21B 17/08* | (2006.01) |

(Continued)

(52) U.S. Cl.
CPC .............. *E21B 17/04* (2013.01); *B23K 31/02* (2013.01); *B23K 33/006* (2013.01); *E21B 17/01* (2013.01); *E21B 17/015* (2013.01); *E21B 17/085* (2013.01); *F16L 13/02* (2013.01); *F16L 13/04* (2013.01); *F16L 57/02* (2013.01); *B23K 2201/06* (2013.01); *B23K 2201/10* (2013.01); *B23K 2203/04* (2013.01); *F16L 1/123* (2013.01); *F16L 1/15* (2013.01)

(58) Field of Classification Search
USPC .......................................................... 166/380
See application file for complete search history.

(56) References Cited

U.S. PATENT DOCUMENTS

| | | | |
|---|---|---|---|
| 2,258,751 A | 10/1941 | Evans | |
| 2,555,256 A * | 5/1951 | Tyson | F16L 13/00 138/176 |

(Continued)

FOREIGN PATENT DOCUMENTS

JP 361086-28 5/1986

*Primary Examiner* — Matthew R Buck
*Assistant Examiner* — Douglas S Wood
(74) *Attorney, Agent, or Firm* — Andrew W. Chu; Craft Chu PLLC (57) ABSTRACT

A method for constructing a tubular connection assembly includes forming a first tubular having a first inner diameter, a first wall thickness, and a first connection end, forming a second tubular having a second inner diameter, a second wall thickness, and a second connection end, and increasing the first wall thickness of the first connection end, increasing the first inner diameter of the first connection end, increasing the second wall thickness of the second connection end, and increasing the second inner diameter of the second connection end. The first tubular and the second tubular are attached at a weld point between the first connection end and the second connection end so as to form a tubular connection assembly with a target amount of fatigue performance. A metallic riser, such as a steel catenary riser or a steel lazy wave riser, can be formed of a plurality of tubular connection assemblies.

20 Claims, 7 Drawing Sheets (51) Int. Cl.
*B23K 33/00* (2006.01)
*F16L 1/12* (2006.01)
*B23K 101/06* (2006.01)
*B23K 101/10* (2006.01)
*B23K 103/04* (2006.01)

(56) References Cited

U.S. PATENT DOCUMENTS

| | | | |
|---|---|---|---|
| 3,458,922 A | 8/1969 | Schellstede et al. | |
| 4,049,186 A * | 9/1977 | Hanneman | B23K 9/0216 |
| | | | 219/137 WM |
| 4,089,455 A * | 5/1978 | Fellers | B23K 31/027 |
| | | | 138/97 |
| 5,562,312 A | 10/1996 | Carlin | |
| 5,743,301 A | 4/1998 | Winship | |
| 7,282,663 B2 | 10/2007 | Alford et al. | |
| 7,897,267 B2 | 3/2011 | Hoyt et al. | |
| 8,167,338 B2 * | 5/2012 | Davies | F16L 13/02 |
| | | | 156/304.2 |
| 8,783,344 B2 | 7/2014 | Aung et al. | |
| 2008/0226396 A1 | 9/2008 | Garcia et al. | |
| 2009/0169912 A1 | 7/2009 | Hoyt | |

* cited by examiner

PRIOR ART

TUBULAR CONNECTION ASSEMBLY FOR IMPROVED FATIGUE PERFORMANCE OF METALLIC RISERS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a tubular connection assembly of metallic risers, such as steel catenary risers and steel lazy wave risers. More particularly, the present invention relates to a tubular connection assembly with improved fatigue performance. Even more particularly, the present invention relates to a tubular connection assembly with flared and thickened ends.

2. Description of Related Art Including Information Disclosed Under 37 CFR 1.97 and 37 CFR 1.98

A steel catenary riser (SCR) or steel lazy wave riser (SLWR) is pipeline comprised of rigid, steel pipes or tubular welded end to end to each other. An SCR connects a pipeline on the seabed to a floating or fixed oil and gas production platform. Fluids, like oil, gas, injection water, etc. are transported between the platform at the surface and the pipeline on the seabed.

The SCR and the SLWR are well known in the offshore industry. The SCR or SLWR hangs down from the floating or fixed platform and into the sea. The SCR shape looks like a curve of a catenary equation in the field of mathematics, hence the term "catenary" in the name of this type of metallic riser. The shape is controlled mainly by water depth and hang-off angle. The SLWR has a buoyancy portion so that there is bend in the curve between the platform and the seabed. The SLWR shape is controlled mainly by water depth, hang-off angle, and buoyancy.

The pipes of the SCR and SLWR are connected by conventional welding techniques. The welds between pipes or tubulars are more critical for fatigue performance than the respective bodies of the pipe. The strength and quality of the welds are directly related to the working life of the SCR and SLWR.

Cyclic loading on the pipes or tubulars of metallic risers, such as SCRs, SLWRs, and top tensioned risers, results in cyclic stresses that lead to fatigue damage, and, given sufficient time, to fatigue failure. The amount time for fatigue failure is typically referred to as the fatigue life. Resistance to fatigue damage is known as fatigue performance. The location where tubulars are welded together is more critical than the body of the tubular and has shorter fatigue life. The cyclic stresses are proportional to the diameter and wall thickness of the tubular. For a given cyclic loading, the cyclic stresses decrease as the wall thickness or diameter increases. As such, there is improved fatigue performance and longer fatigue life, as the wall thickness or diameter increases.

Various patents and publications have disclosed inventions related to metallic risers. Upset ends or thickening of the end of the pipe are well established as means for improving welded connections of adjoining pipes. U.S. Pat. No. 2,258,751, issued to Evans on Oct. 14, 1941, teaches a method of making welded tool joints whereby the wall thickness of the pipe at the weld point is increased by machining the weld to a greater thickness. The thickness is at least equal to a thickened end of an adjacent pipe. The object of the invention is to increase the strength at the weld point by increasing the thickness. The figures demonstrate the thickened wall aspect of the invention at the weld point. The internal diameter of the pipe is constant.

U.S. Pat. No. 3,458,922, issued to Schellstede, et al. on Aug. 5, 1969, teaches a method of constructing a drill pipe protector. Pipe with thickened or upset ends are welded together. The welded ends form an integral collar, which protects the drill pipe. According to the figures, the pipe retains the same diameter within the joined pipe.

Japanese Patent No. 361086028, issued to Hashimoto, et al. on May 1, 1986, discloses the method for production of plate rolled steel pipe with a thickened end part. The inner diameter of the pipe is fixed, but the outer diameter at the end portion of the pipe shaft is produced by plate rolling a steel plate of a different thickness. The resulting thickened end may then be welded to an opposing end of a second to create a joint.

U.S. Pat. No. 7,282,663, issued to Alford, et al. on Oct. 16, 2007, teaches an automated forge welding method, which may be used to join pipe ends in a welding chamber while the ends are maintained, aligned, and parallel relative to each other. The amount of upset is controlled within a particular thickness range.

Other references continue to disclose the upset ends with further improvements to aspects of the weld, such as male-female connector limitations, axial symmetry limitations and constant diameter of the flow channel limitations.

U.S. Pat. No. 5,562,312, issued to Carlin on Oct. 8, 1996, teaches a system and method for enhancing fatigue and load properties of a drill pipe at the pipe section welds by using helical welding of pipes cut at matching helical angles, instead of circular welding. The stresses at any cross section will be distributed between the weld and the pipe body, the latter usually being stronger. The outer diameters of the pipes are the same.

Figure 4:
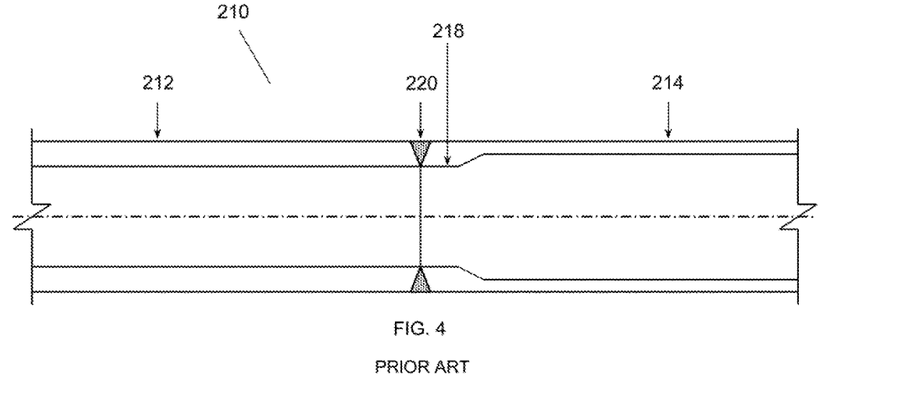
FIG. 4 is another schematic view of another tubular assembly of the prior art.

U.S. Pat. No. 7,897,267, issued to Hoyt, et al. on Mar. 1, 2011, also discloses a system and method of improving riser weld fatigue. In one embodiment, a SCR is formed using riser joints which are bonded together using dissimilar weld material from the pipe sections. The riser joints are provided with a partial cladding which increases the fatigue performance of the weld. FIG. 4 demonstrates that the inner and outer diameters are the same at the weld point, after the welding and cladding processes.

Figure 2:
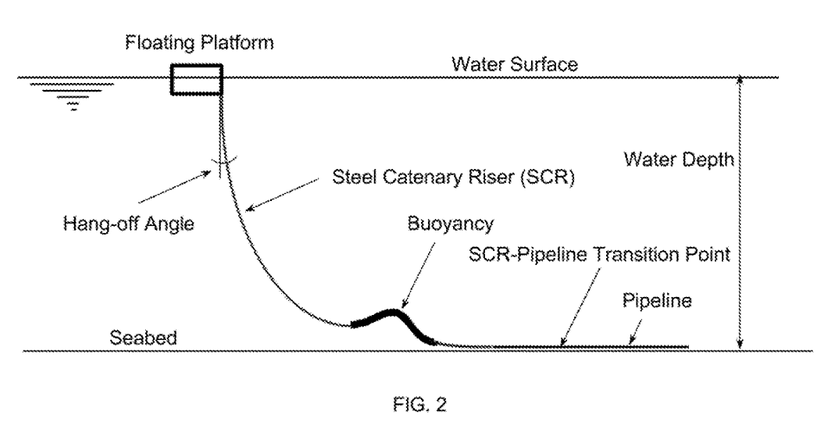
FIG. 2 is a schematic view of a steel wire lazy riser.

United States Publication No. 20080226396, published for Garcia, et al. on Sep. 18, 2008, discloses a seamless steel tube for use as a SCR with a particular chemical composition and pipe body constructions having a transition zone and an upset end. The transition zone was a symmetric thickening, and the flow channel stayed in the same orientation. FIG. 2 demonstrates the wall thickness at the joint is of a greater external diameter than the rest of the pipe body. The publication discloses restrictive chemical composition limitations.

U.S. Pat. No. 8,783,344, issued to Aung, et al. on Jul. 22, 2014, claims the method of manufacturing a wear resistant drill pipe by joining a first and second drill pipe. Each drill pipe has an upset end at the joining end. The upset ends are substantially equal on both pipes in terms of their external diameter, and the external diameter is greater that then external diameter of the rest of the drill pipe. The increase in external diameter is the product of redistributing a portion of a substrate material at the upset end of the first and second drill pipe. The method of joining the first and second drill pipe at their upset ends may be an inertia welding or friction welding process. The internal diameter remains the same through the drill pipes.

The prior art reduces the cyclic stresses by increasing only the wall thickness for a given diameter. There are limitations on only increasing wall thickness with constant internal diameter or decreased internal diameter to achieve a desired fatigue life and fatigue performance. There are technical limitations on wall thickness due to weld quality. Being too thick can reduce the weld quality, such that the weld would not be sufficient for SCR or SLWR applications. There are practical limitations as well because the welds are performed offshore onboard an installation vessel with costly day rates. A complicated weld process to maintain weld quality reduces the numbers of welds to be completed in one day. The costs for an SCR or SLWR for pipes or tubular with increased thickness can be increased too high for deployment in the field.

It is an object of the present invention to provide a method and tubular connection assembly for metallic risers with improved fatigue performance.

It is an object of the present invention to provide a method and tubular connection assembly for a steel catenary riser or a steel lazy wave riser with more durable welds.

It is an object of the present invention to provide a method and tubular connection assembly for a steel catenary riser or a steel lazy wave riser with cost efficient welds.

It is an object of the present invention to provide a method and tubular connection assembly for metallic risers with flared and thickened ends.

It is another object of the present invention to provide a method and tubular connection assembly for metallic risers with increased internal diameter and increased wall thickness at the weld point for adjoining pipes.

It is an object of the present invention to provide a method and tubular connection assembly for metallic risers with an amount of increased internal diameter at an end related to an amount of increased wall thickness at that end.

It is another object of the present invention to provide a method and tubular connection assembly for metallic risers with fatigue performance improved by increasing internal diameter relative to increasing wall thickness.

These and other objectives and advantages of the present invention will become apparent from a reading of the attached specifications and appended claims.

BRIEF SUMMARY OF THE INVENTION

Embodiments of the present invention include the method for connecting a tubular assembly so as to form a tubular connection assembly. The tubular connection assembly can be used in metallic risers, such as a steel catenary riser or a steel lazy wave riser, to be connected to a pipeline from a platform. The method of the present invention includes flaring and thickening connection ends for a weld point with improved fatigue performance. The tubular of the tubular connection assembly can be formed by forging, cold expansion, hot expansion, upsetting, machining or other suitable procedure, including three-dimensional printing or additive manufacturing. The welds can be made by iron based or non-iron based materials. The weld bevel can be V-shaped, J-shaped, or other suitable shape for bonding between the tubular. In some embodiments, the connection ends are separate from the tubular and must be made integral with the tubular. The connection ends have a length to maintain the performance of the main body of the tubular, even when the connection ends are flared and thickened. The connection ends also each have a length to enable welding, fabrication, and inspection of the attachment to an adjacent tubular.

The present invention includes the method of forming the tubular assembly. The steps include forming a first tubular having a first inner diameter and a first wall thickness and forming a second tubular having a second inner diameter and a second wall thickness. The first tubular has a first connection end, and the second tubular has a second connection end. The method includes increasing the first wall thickness of the first connection end, according to a first amount of increase in the first wall thickness, and the first inner diameter of the first connection end is increased to a first increased inner diameter according to the first amount of increase in the first wall thickness. Similarly, the second wall thickness of the second connection end is increased according to a second amount of increase in the second wall thickness, and the second inner diameter of the second connection end is increased to a second increased inner diameter according to the second amount of increase in the second wall thickness. The second connection end is aligned with the first connection end even if the first connection end and the second connection end are not identical. Embodiments of the method include attaching the first tubular and the second tubular at a weld point between the first connection end and the second connection end so as to form a tubular connection assembly.

For the present invention, the increases in wall thickness and inner diameter improve fatigue performance. The method of flaring inner diameters and thickening walls at the connection ends relate to a particular improvement of the weld point of the tubular connection assembly by a target amount as required. The fatigue performance of the weld point is an improvement greater than a weld point between the first inner diameter and the first wall thickness and the second inner diameter and the second wall thickness. The connection ends are formed with lengths to maintain the integrity of the tubular and to enable fabrication and inspection of the weld point between the tubulars. The invention maintains the original strengths of the first tubular with the first wall thickness and first inner diameter and the second tubular with the second wall thickness and second inner diameter. Alternative embodiments include forming tubular connection assemblies with connection ends as separate end pieces. The method can include attaching the end pieces to the respective tubulars after the steps of increasing the respective wall thicknesses and inner diameters.

DETAILED DESCRIPTION OF THE INVENTION

Figure 1:
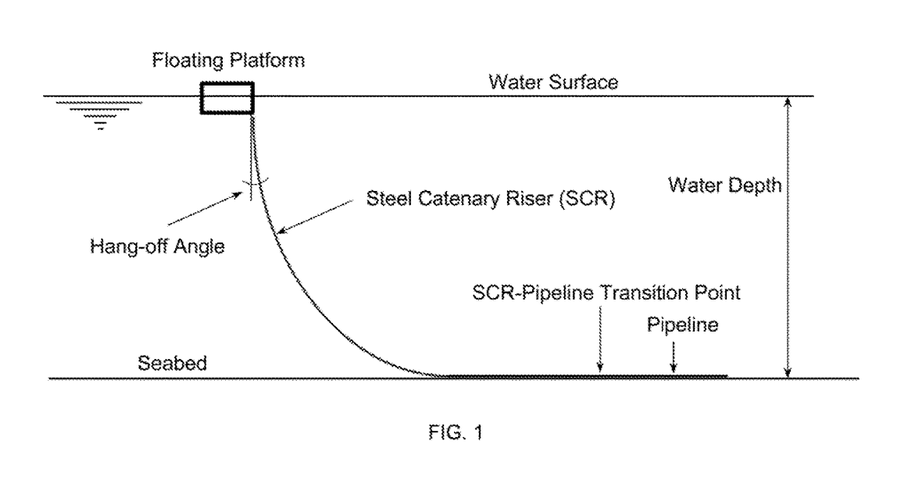
FIG. 1 is a schematic view of a steel catenary riser.

FIGS. 1 and 2 show metallic risers. The steel catenary riser (SCR) in FIG. 1 hangs down from a floating platform at a hang-off angle. The SCR reaches the seabed to a transition point connected to a pipeline. The SCR can span from the water surface to the seabed for the entire water depth. The steel lazy wave riser (SLWR) in FIG. 2 has a buoyancy portion, so that the curve is different from the SCR. The SLWR has more than one curvature. The fatigue performance of both the SCR and SLWR relate to the weld points between adjacent tubulars or tubular members.

Figure 3:
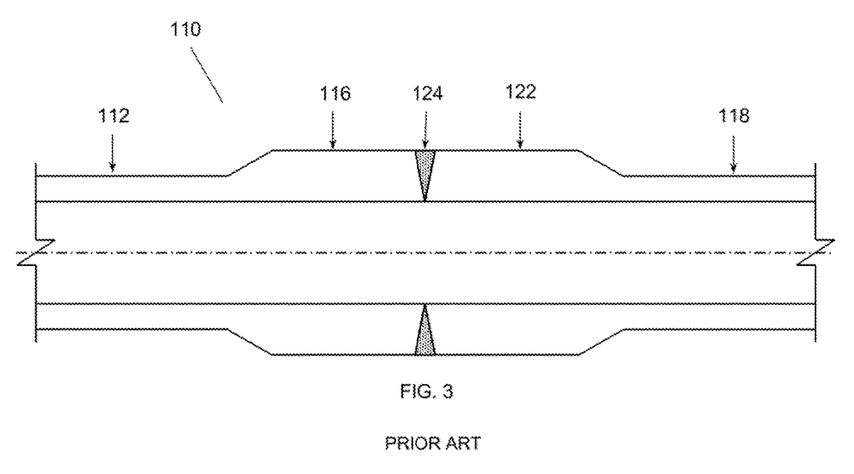
FIG. 3 is a schematic view of a tubular assembly of the prior art.

The prior art in FIG. 3 shows increasing fatigue performance relative to wall thickness only, and FIG. 4 shows increasing fatigue performance relative to wall thickness again, wherein the wall thickness is increased by decreasing the inner diameter at the weld point. These prior art assemblies are limited by the technical considerations, cost concerns, and physical limitations. The wall thickness cannot always be realistically increased for a better fatigue performance. There can be too much thickness for several reasons.

FIG. 3 shows a tubular connection assembly 110 with a first tubular 112 and a second tubular 118. Each pipe or tubular 112, 118 has an upset end 116, 122, respectively, connected by bonding material 124. The increase in wall thickness of the upset ends 116, 122 increases strength and fatigue performance. The internal diameter remains constant. The increase in fatigue performance is limited by how much the wall thickness can be increased.

FIG. 4 shows a tubular assembly 210 with a first tubular 212 and a second tubular 214. Tubular 214 has an upset end 218. The upset end 218 has a wall thickness to match the first tubular 212. The first tubular 212 and the second tubular 214 are welded together by bonding material 220. There is another type of increase in wall thickness of the second tubular 214. In this prior art example, the internal diameter is actually decreased, as the external diameters of the first tubular 212 and the second tubular 214 remain the same. The increase in fatigue performance is again limited by how much the wall thickness can be increased.

Embodiments of the present invention improve fatigue performance and increase fatigue life of a metallic riser. Increasing wall thickness has been used in the prior art to improve fatigue performance, including increasing wall thickness by decreasing inner diameter. The present invention discloses a synergistic method increasing wall thickness and increasing inner diameter for a particular improvement of fatigue performance beyond the prior art.

Figure 5:
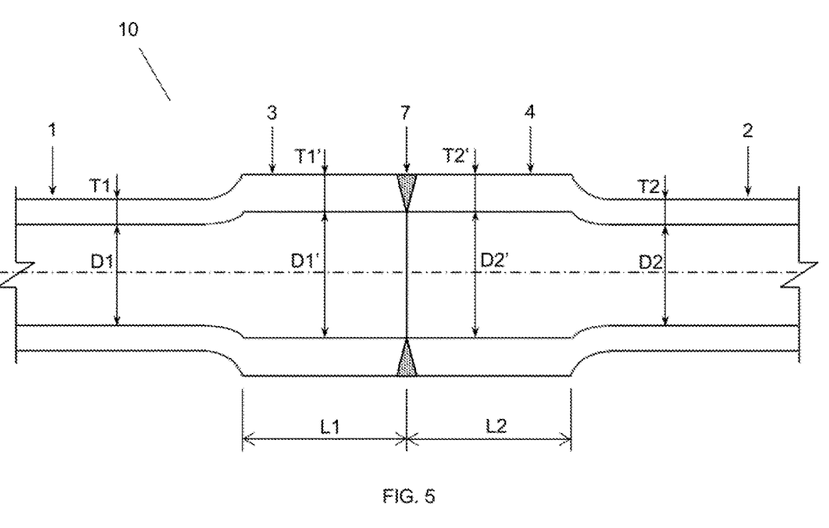
FIG. 5 is a sectional view of an embodiment of the method and tubular connection assembly according to the present invention.
Figure 6:
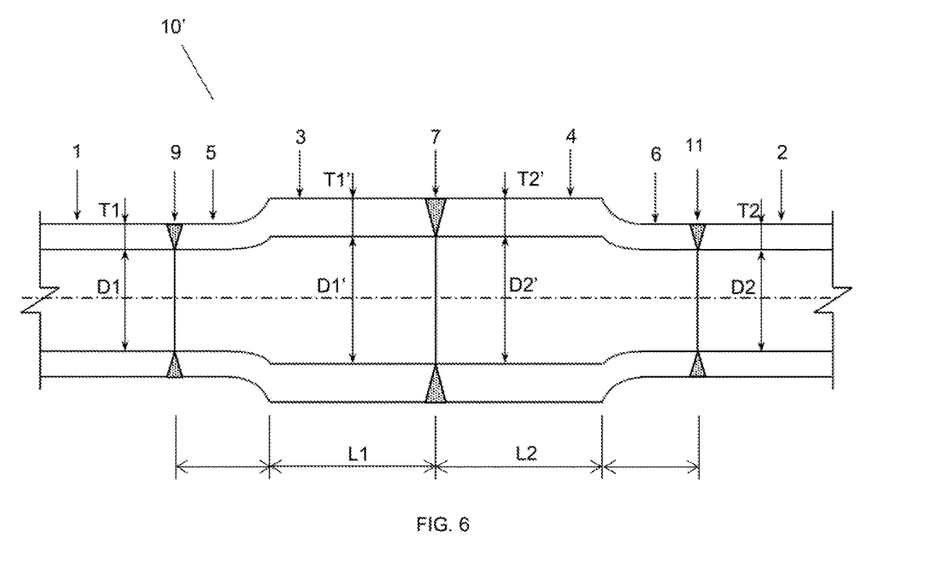
FIG. 6 is another sectional view of an alternative embodiment of the method and tubular connection assembly, according to the present invention, showing connection ends as separate end pieces made integral with the respective tubulars.

FIGS. 5 and 6 show embodiments of the method for connecting a tubular assembly of the present invention. The method includes forming a first tubular 1 having a first inner diameter D1 and a first wall thickness T1 and forming a second tubular 2 having a second inner diameter D2 and a second wall thickness T2. The initial respective inner diameters D1, D2 and wall thicknesses T1, T2 can be equal or unequal. FIG. 5 shows one example with first tubular 1 and second tubular 2 with equal initial inner diameters D1, D2 and wall thickness T1, T2. The first tubular 1 is comprised of a first connection end 3, and the second tubular 2 is comprised of a second connection end 4. In some embodiments, there are corresponding connection ends on opposite ends of the respective tubular 1, 2 for connection to another adjacent tubular. The present invention is recited with regard to one assembly of the first tubular 1 and the second tubular 2. Adjacent assemblies formed by the same method can be attached at any time.

The first connection end 3 and the second connection end 4 must be aligned, even when the first inner diameter D1 and first wall thickness T1 are not identical to the second inner diameter D2 and the second wall thickness T2. There must be alignment at the first connection end 3 and second connection end 4 with the same outer diameter and abutment of the respective walls with compatible wall thickness for welding. In the method of the present invention, the first wall thickness T1 of the first connection end 3 is increased according to a first amount T1' and the second wall thickness T2 of the second connection end 4 is increased according to a second amount T2' so that the first connection end 3 and the second connection end 4 are aligned. In some embodiments, the first amount T1' has a maximum of about 115% of the first wall thickness T1 and the second amount T2' has a maximum of about 115% of the second wall thickness T2. The maximum amount of increase of T1' and T2' can be a maximum of about 15% of the first wall thickness T1 and second wall thickness T2, respectively. Embodiments can also include a first amount T1' less than about five inches. The second amount T2' aligns the second connection end 4 with the first connection end 3, so the second amount T2' can also be less than about five inches. Instead of continuously increasing wall thickness to improve fatigue performance, there is a range compatible with another aspect of the present invention. The increases of the range of the present invention achieve an improved fatigue performance that is not possible in the prior art.

That other aspect of the present invention is the step of increasing the first inner diameter D1 of the first connection end 3 to a first increased inner diameter D1' and increasing the second inner diameter D2 of the second connection end 4 to a second increased inner diameter D2'. The first increased inner diameter D1' depends upon the first amount T1' of increase in the first wall thickness T1, and the second increased diameter D2' depends upon the second amount T2' of increase in the second wall thickness T2. Then, the first tubular 1 and the second tubular 2 are attached at a weld point 7 between the first connection end 3 and the second connection end 4 so as to form a tubular connection assembly 10.

Figure 7:
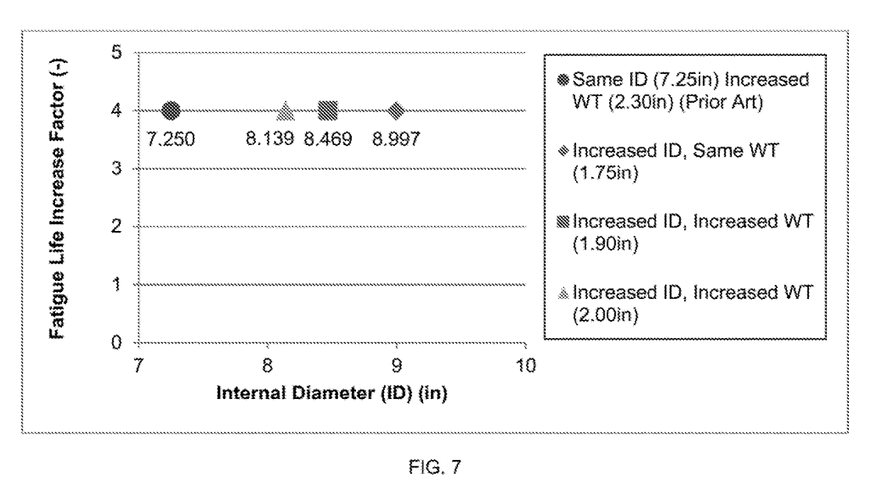
FIG. 7 is a graph illustration of the fatigue performance of the method and tubular connection assembly, according to one embodiment of the present invention.

In the present invention, the first connection end 3 is thickened by the first amount T1' of increase in the first wall thickness T1 and flared to the first increased inner diameter D1', and the second connection end 4 is thickened by the second amount T2' of increase in the second wall thickness T2 and flared to the second increased inner diameter D2' so as to increase fatigue performance of the weld point 7 of the tubular connection assembly 10. In the present invention, the weld point 7 with the flared inner diameters D1', D2' in combination with the thickened amounts T1', T2' of increase in wall thickness can have a greater fatigue performance than a weld point between the first inner diameter D1 and the first wall thickness T1 and the second inner diameter D2 and the second wall thickness T2. The fatigue performance can be increased to a target amount. The target amount can be a pre-set range, determined by specific physical conditions, regulatory requirements, customer demand, or a combination thereof. The target amount within a pre-set range corresponds to a fit-for-purpose weld point so that tubular assembly can have the desired fatigue performance for a given deployment from the surface. In one embodiment, the target amount is a 400% increase in fatigue performance, as shown in FIG. 7. The target amount is no longer limited by practical considerations of increasing wall thickness. The present invention incorporates another feature to achieve a new result, that was not possible with the wall thickness increase of the prior art. In some embodiments and in the step of increasing the first inner diameter D1 of the first connection end 3, the first increased inner diameter D1' is less than about six inches greater than the first inner diameter D1. The step of increasing the second inner diameter D2 of the second connection end 4, the second increased inner diameter D2' aligns with the first increased inner diameter, such that the second increase inner diameter D2' can also be less than about six inches greater than the second inner diameter D2.

In the prior art, there is no increase in the inner diameter D1, D2 to improve fatigue performance, and the references teach against increasing the inner diameter by reliance upon decreases in inner diameter, as in FIG. 4, to improve fatigue performance. The method of the present invention provides for improving fatigue performance against the teachings of the prior art with respect to inner diameter. The present invention further shows a synergistic effect of improving more than expected for increases in wall thickness. Even the prior art system showing increasing wall thickness for fatigue performance cannot attain the level of improvement in fatigue performance as in the present invention.

Embodiments of the present invention further include the first connection end 3 having a first connection length L1 to maintain performance of the first tubular 1. The increases of the first inner diameter D1 and the first wall thickness T1 are restricted to the first connection end 3, so that the main body of the first tubular 1 remains strong and durable as formed or fabricated. The first connection length L1 enables the welding and fabrication of the first tubular 1 and weld point 7, as well as the inspection of the weld point 7. The first amount of increase in the first wall thickness and the first increased diameter for the target amount is adjusted according to the first connection length. Similarly, the second connection end 4 has a second connection length L2 to maintain performance of the second tubular 2 and fabrication and inspection of weld point 7. The increases of the second inner diameter D2 and the second wall thickness T2 do not adversely affect the performance of the second tubular 2. The second connection length L2 enables the welding and fabrication of the second tubular 2 and weld point 7, as well as the inspection of the weld point 7. The second amount of increase in the second wall thickness and the second increased diameter for the target amount is adjusted according to the second connection length. The first connection length L1 and the second connection length L2 can further modify the wall thickness changes, which are already modified by increases in inner diameter, to still properly achieve a target amount of fatigue performance for a fit-for-purpose tubular assembly. Various embodiments show the first connection end 3 and the second connection end 4 each having respective connection lengths L1, L2 between about 3-33% of respective lengths of the first tubular and second tubular. Embodiments also include respective connection lengths L1, L2 being between about 4-48 inches. The connection lengths L1, L2 can be equal or unequal, as long as the first connection end 3 aligns with the second connection end 4. FIGS. 5 and 6 show the first connection length L1 and the second connection length L2 as equal. Other variations are possible.

FIG. 6 shows an alternate embodiment 10', wherein the first connection end 3 comprises a first end piece 5 and the second connection end 4 comprises a second end piece 6. In this embodiment, the end pieces 5, 6 and respective connection ends 3, 4, are separate from the first tubular 1 and the second tubular 2, respectively. The end pieces 5, 6 are attachable to the tubulars 1, 2 and can be made integral with the respective tubular 1, 2. Separate weld points 9, 11 attach each end piece 5, 6 so that any tubulars 1, 2 can be retrofitted or modified for the present invention. Weld points 9 and 11 can be beveled into a V-shape, J-shape or other shape to maintain or improve performance of the welds on tubulars 1, 2. The welding and fabrication of the tubular 1, 2, as well as the ability to inspect the weld points 9, 11 should not affect strength and quality at the weld point 7. In the method of the present invention, the first end piece 5 is attached to the first tubular 1, after the steps of increasing the first wall thickness T1 and increasing the first inner diameter D1 are performed on the first end piece 5. Also, the second end piece 6 is attached to the second tubular 2, after the steps of increasing the second wall thickness T2 and increasing the second inner diameter D2 are performed on the second end piece 6. The end pieces 5, 6 can be fabricated by known means separate from the tubulars 1, 2. Embodiments of the present invention include one tubular with a separate end piece for a connection end and one tubular made integral with a connection end. The tubulars do not need to be identical or symmetrical, even when one tubular has a separate end piece for the connection end.

In the present invention, each step of increasing the first wall thickness T1, increasing the first inner diameter D1, increasing the second wall thickness T2, and increasing the second inner diameter D2 can be accomplished by forging, cold expansion, hot expansion, upsetting, or machining or other suitable process for fabricating. Additive manufacturing may also be considered for the present invention. The transitions from the respective wall thicknesses T1, T2 and inner diameters D1, D2 to the respective amounts of increase T1', T2' of wall thicknesses and increased inner diameters D1, D2' can be gradual, curved, angled or arc shaped. The transitions are selected to minimize the cyclic stress amplification resulting from the discontinuity due to the increases in thickness and inner diameter. In the present invention, the first connection end 3 and the second connection end 4 must be aligned, even if the first tubular 1 and second tubular 2 are not identical or even symmetrical.

The step of attaching the first tubular 1 and the second tubular 2 comprises welding the first tubular 1 to the second tubular 2 with a weld material at the weld point 7. The weld material can be iron based or non-iron based. In some embodiments, the method further includes beveling the weld point 7 into a shape, such as a V-shape, J-shape or another shape selected to maintain or improve the weld quality.

Embodiments of the present invention include a metallic riser comprised of a plurality of tubular connection assemblies 10 formed according to the method of present invention, and a transition point connected to a pipeline. The metallic riser formed by the method of the present invention includes each first tubular 1 and each second tubular 2 being fabricated by forging, cold expansion, hot expansion, rolling, upsetting, machining, and any other suitable process, such as additive manufacturing. Each first tubular 1 and each second tubular 2 are attached by welding, and the weld material can be iron based on non-iron based. The welding can also be beveled into a shape to improve or maintain weld quality. In some embodiments, the connection ends 3, 4 are not integral with the tubulars 1, 2, such that the connection ends 3, 4 are modular attachments, such as the end pieces 5, 6 of FIG. 6, to be welded to the respective tubulars 1, 2. In those embodiments, at least one first connection end 3 comprises a first end piece 5 attached to a respective first tubular 1, after the steps of increasing the first wall thickness T1 and increasing the first inner diameter D1 are performed on the first end piece 5. Also, at least one second connection end 4 comprises a second end piece 6 attached to a respective second tubular 2, after the steps of increasing the second wall thickness T2 and increasing the second inner diameter D2 are performed on the second end piece 6. In some embodiments, each first connection end 3 has a first connection length L1 and each second connection end 4 has a second connection length L2. The connection lengths L1, L2 can be equal or non-equal across a respective weld point 7, but the connection length should maintain performance of the tubular connection at the weld point 7 and each respective tubular in sections with the initial wall thickness and initial inner diameter. The connection lengths L1, L2 enable the welding and fabrication of the tubular connection at the weld point 7 and respective first and second tubulars 1, 2, as well as the inspection of the weld point 7 between the first and second tubular 1, 2.

The present invention provides a method and tubular connection assembly for metallic risers with a particular improved fatigue performance. Each tubular connection assembly made by the method can be used for a steel catenary riser or a steel lazy wave riser. The weld points are more durable and cost efficient. The improved fatigue performance results from more than increasing wall thickness. The particular improved fatigue performance is based on a limited increasing wall thickness and an increasing inner diameter. The present invention is not restricted by declining weld quality for too much thickness. The thickened and flared connection ends by increasing respective wall thicknesses and increasing respective inner diameters of the method of the invention allow for the same weld procedure qualification, which saves money. The particular flaring by increasing the inner diameter defies limitations based only on wall thickness and prior art systems and methods to decrease inner diameter for improved fatigue performance, and preserves functionality for subsequent procedures, such as pigging. Instead of shrinking the inner diameter, there is an increase for compatibility with testing through the assembly. The amount of increasing inner diameter preserves the compatibility for pigging and other procedures.

The weld point for adjoining pipes or tubular is improved in a manner described in the present application. The amount of increased internal diameter at an end relates to an amount of increased wall thickness at that end. The improvement and the amount of improvement is provided by a method and tubular connection assembly for metallic risers of the present invention.

The foregoing disclosure and description of the invention is illustrative and explanatory thereof. Various changes in the details of the illustrated structures, construction and method can be made without departing from the true spirit of the invention.

I claim:

1. A method for connecting a tubular assembly, comprising the steps of:
   forming a first tubular having a first inner diameter and a first wall thickness, said first tubular being comprised of a first connection end;
   forming a second tubular having a second inner diameter and a second wall thickness, said second tubular being comprised of a second connection end;
   increasing said first wall thickness of said first connection end, according to a first amount of increase in said first wall thickness;
   increasing said first inner diameter of said first connection end to a first increased inner diameter according to said first amount of increase in said first wall thickness;
   increasing said second wall thickness of said second connection end, according to a second amount of increase in said second wall thickness, so as to align with said first connection end;
   increasing said second inner diameter of said second connection end to a second increased inner diameter according to said second amount of increase in said second wall thickness so as to align with said first connection end;
   attaching said first tubular and said second tubular at a weld point between said first connection end and said second connection end so as to form a tubular connection assembly, said first increased inner diameter being greater than said first inner diameter at said weld point, said second increased inner diameter being greater than said second inner diameter at said weld point,
   wherein said first connection end with said first amount of increase in said first wall thickness and said first increased inner diameter and said second connection end with said second amount of increase in said second wall thickness and said second increased inner diameter increases fatigue performance of said weld point of said tubular connection assembly by a target amount greater than fatigue performance of a weld point between said first inner diameter and said first wall thickness and said second inner diameter and said second wall thickness.

2. The method for connection, according to claim 1, wherein said first amount of increase in said first wall thickness is less than about five inches.

3. The method for connection, according to claim 1, wherein said first amount of increase in said first wall thickness has a maximum of about 15% of said first wall thickness.

4. The method for connection, according to claim 1, wherein said second amount of increase in said second wall thickness has a maximum of about 15% of said second wall thickness.

5. The method for connection, according to claim 1, wherein said target amount is within a pre-set range.

6. The method for connection, according to claim 1, wherein said first increased inner diameter is less than about six inches greater than said first inner diameter.

7. The method for connection, according to claim 6, wherein said second increased inner diameter is less than about six inches greater than said second inner diameter.

8. The method for connection, according to claim 1, wherein said first connection end has a first connection length, said first inner diameter and said first wall thickness maintaining performance of said first tubular and said weld point, said first amount of increase in said first wall thickness and said first increased diameter for said target amount being adjusted according to said first connection length.

9. The method for connection, according to claim 8, wherein said second connection end has a second connection length, said second inner diameter and said second wall thickness maintaining performance of said second tubular and said weld point, said second amount of increase in said second wall thickness and said second increased diameter for said target amount being adjusted according to said second connection length.

10. The method for connection, according to claim 1, wherein said first connection end has a first connection length about 3-33% of a length of said first tubular.

11. The method for connection, according to claim 10, wherein said second connection end has a second connection length about 3-33% of a length of said second tubular.

12. The method for connection, according to claim 1, wherein said first connection end has a first connection length between about 4-48 inches.

13. The method for connection, according to claim 12, wherein said second connection end has a second connection length between about 4-48 inches.

14. The method for connection, according to claim 1, wherein said first connection end comprises a first end piece, wherein the method further comprises:
attaching said first end piece to said first tubular, after the steps of increasing said first wall thickness and increasing said first inner diameter are performed on said first end piece.

15. The method for connection, according to claim 14, wherein said second connection end comprises a second end piece, wherein the method further comprises:
attaching said second end piece to said second tubular, after the steps of increasing said second wall thickness and increasing said second inner diameter are performed on said second end piece.

16. The method for connection, according to claim 1, wherein each step of increasing said first wall thickness, increasing said first inner diameter, increasing said second wall thickness, and increasing said second inner diameter is comprised of at least one of a group consisting of: forging, cold expansion, hot expansion, upsetting, and machining.

17. A metallic riser, comprising:
a plurality of tubular connection assemblies, each tubular connection assembly being formed according to the method of claim 1; and
a transition point connected to a pipeline.

18. The metallic riser, according to claim 17, wherein at least one first connection end comprises a first end piece, said first end piece being attached to a respective first tubular, after the steps of increasing said first wall thickness and increasing said first inner diameter are performed on said first end piece.

19. The metallic riser, according to claim 18, wherein at least one second connection end comprises a second end piece, said second end piece being attached to a respective second tubular, after the steps of increasing said second wall thickness and increasing said second inner diameter are performed on said second end piece.

20. The metallic riser, according to claim 19, wherein each first connection end has a first connection length, each first inner diameter and each first wall thickness maintaining performance of each first tubular, said first amount of increase in said first wall thickness and said first increased diameter for said target amount being adjusted according to said first connection length, and wherein each second connection end has a second connection length, each second inner diameter and each second wall thickness maintaining performance of each second tubular, said second amount of increase in said second wall thickness and said second increased diameter for said target amount being adjusted according to said second connection length.

* * * * *